Patented May 8, 1951

2,552,237

UNITED STATES PATENT OFFICE 2,552,237

DEVICE FOR HEATING FLUIDS BY MEANS OF SOLAR ENERGY

Felix Trombe, Paris, France, assignor to Centre National de la Recherche Scientifique, Paris, France, a society of France Application March 25, 1950, Serial No. 151,972
In France March 24, 1949

6 Claims. (Cl. 126—271)

It has already been endeavoured, for a long time, to make use of solar energy for obtaining mechanical energy and many devices were suggested for this purpose.

Most of these devices make use of a steam engine the fluid of which is heated by concentration of solar energy. However, these devices were never much used because the outputs obtained up to this time were always very low (from 4 to 5%). This is due, in particular, to the low concentration of the sun rays and to the large area of loss of the generator.

The object of the present invention is to heat a fluid by means of solar energy, heating taking place by circulation of this fluid through a cavity which is well heat insulated and provided with a narrow opening through which preliminarily concentrated sun rays penetrate into this cavity.

In such a cavity, the temperature that is obtained may reach, when heat insulation is perfect, a temperature equal to that which would be obtained on a perfectly absorbing surface placed at the level of the orifice through which the rays are admitted.

The present invention is concerned with the application of such cavities to the heating of a fluid, this fluid being preferably used in a thermal engine.

The advantages are then important and bear in particular upon the following points:

a. Radiation and conduction losses are reduced to a minimum;

b. It is possible to reach very high temperatures without local overheating and considerably to improve the output.

I will now indicate, by way of nonlimitative example, a possible embodiment of the invention, with reference to the annexed drawing, which shows in a very diagrammatic manner, the portion of the device in which the fluid is heated.

Figure 1:
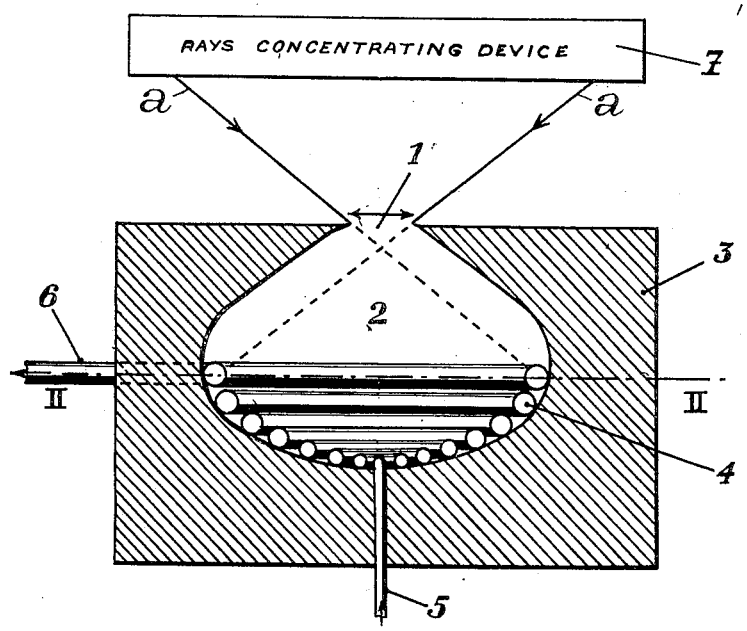
Figure 2:
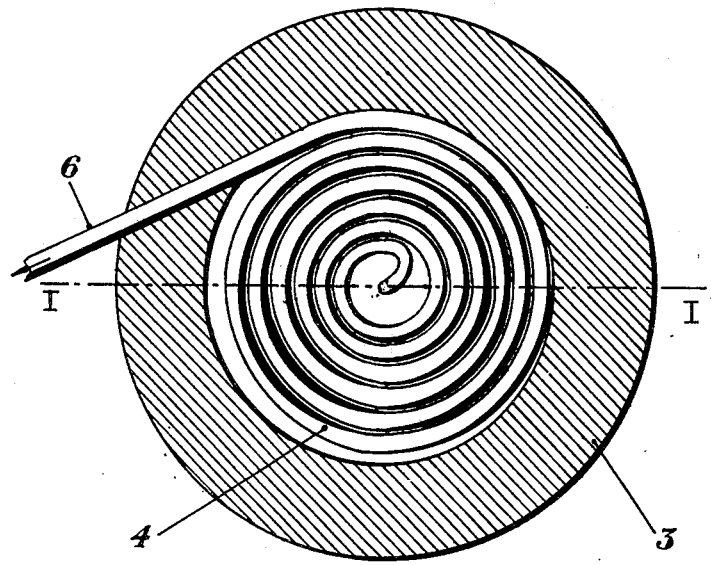

Fig. 1 is a sectional view on the line I—I of Fig. 2, and Fig. 2 is a sectional view on the line II—II of Fig. 1.

Solar rays, made convergent by means of a device diagrammatically shown by the drawing at 7, enter through a narrow opening 1 a large size cavity 2 carefully heat insulated by means of a thermal insulating material 3. A tube 4 is disposed in this cavity. In the annexed drawing this tube is spiral wound and rests directly upon the wall of cavity 2, but obviously the tube might be given a different shape and be located at a distance from the wall. From the drawing, it is clear that the cavity has a cross section of maximum diameter lying parallel to the plane of the opening 1, and that this cross section lies between the tube and the opening. In other words, the tube lies on the opposite side of the plane of this cross section of maximum diameter, from opening 1.

Heating of the tube 4 takes place under the effect of the rays entering directly through opening 1 and of the secondary radiation from the wall. The fluid enters at 5, flows through the coiled tube 4 and leaves through tube 6, the outflowing hot fluid being preferably used to operate a thermal engine, for instance a steam engine.

The use of a heat insulated vessel and the absence of any hot point make it possible for the fluid to reach a high temperature without risk of melting of the tube. The thermal efficiency of a power plant operated by this fluid is therefore much higher than that supplied by the usual devices making use of thermal energy.

It is even possible to replace the usual steam engine by a hot gas engine which, owing to recent improvements, has now reached a thermodynamic efficiency approximating that of explosion engines.

As the gas (air or steam) flow rate that is obtained increases with its superheating, the arrangement that is indicated makes it possible to avoid sharp bends in the superheated portion of the tube. If so desired, the diameter of the tube may increase from the center toward the periphery of the coil. At 5, except for the effects of friction losses, the pressure is the same as at 6. The motive energy is then obtained by increase of the fluid volume between 5 which is connected to a compressor and 6 which is connected to the engine.

If the heat insulating envelope 3 has a heat conductivity sufficiently low, the loss of energy of such a system is essentially constituted by that due to radiation at opening 1. But this loss can be reduced to a low value. If, for instance, an amount of solar energy averaging 3 kw. penetrates through an orifice of 1 sq. cm. into a cavity kept, by circulation of the fluid, at a temperature averaging 1000° C., the radiation loss through the opening averages 10 watts, i. e. 0.3% of the incident energy.

Of course, the embodiment which has just been indicated is given merely by way of example.

What I claim is:

1. A device for heating a fluid by means of solar energy which comprises, in combination, heat insulating means forming a cavity provided with a small opening of substantially circular shape communicating with the outside atmosphere, said cavity having its cross section of maximum diameter lying in a plane parallel to the plane of said opening, means for concentrating sun rays into a beam having its focus substantially in said opening, and tubular means located inside said cavity on the opposite side of said plane of maximum diameter from said opening, said tubular means having at least one inlet and one outlet for circulating said fluid, said tubular means being disposed so as to form intercepting surfaces in the direct path of said beam beyond said focus.

2. A device for heating a fluid by means of solar energy which comprises, in combination, heat insulating means forming a cavity provided with a small opening of substantially circular shape communicating with the outside atmosphere, the cross sections of said cavity parallel to said opening being also generally circular, means for concentrating sun rays into a beam having its focus substantially in said opening, and at least one tube having one inlet and one outlet for circulating said fluid inside said cavity, said tube being spiral wound to form in said cavity what amounts to a circular grid across said beam and beyond said focus, said spiral wound tube being located on the other side of the plane of the cross section of maximum diameter, from said opening.

3. A device according to claim 2 in which the outer diameter of said grid is substantially equal to that of said beam in the cross section plane where the outer portion of said grid is located.

4. A device according to claim 2 in which the inlet of said tube is at the center of the spiral and the outlet at its periphery.

5. A device for heating a fluid by means of solar energy which comprises, in combination, heat insulating means forming a cavity provided with a small opening of substantially circular shape communicating with the outside atmosphere, the cross sections of said cavity taken in planes parallel to said opening being also generally circular, means for concentrating sun rays into a beam having its focus substantially in this opening, and at least one tube having one inlet and one outlet for circulating said fluid inside said cavity, said tube being spiral wound to form in said cavity what amounts to a circular grid across said beam and beyond said focus, said spiral wound tube being located on the other side of the plane of the cross section of maximum diameter, from said opening, the inlet of the tube being at the center of the spiral and the outlet at the periphery, and the cross sectional area of the tube increasing from the inlet thereof to the outlet.

6. A device for heating a fluid by means of solar energy which comprises, in combination, heat insulating means forming a cavity provided with a small opening of substantially circular shape communicating with the outside atmosphere, the cross sections of said cavity taken in planes parallel to said opening being also generally circular, means for concentrating sun rays into a beam having its focus substantially in this opening, and at least one tube having one inlet and one outlet for circulating said fluid inside said cavity, said tube being spiral wound to form in said cavity what amounts to a circular grid across said beam and beyond said focus, said spiral wound tube being located on the other side of the plane of the cross section of maximum diameter, from said opening, the surface of the cavity opposite said opening being rounded, said spiral tube being disposed along and substantially in contact with said rounded surface so that the outer turns of the spiral are nearer the plane of the opening than the inner turns, said inlet being located at the center of the spiral and the outlet at the periphery of the spiral, said tube increasing in cross sectional area from the inlet thereof to the outlet.

FELIX TROMBE.

REFERENCES CITED

The following references are of record in the file of this patent:

UNITED STATES PATENTS

| Number | Name | Date |
|---|---|---|
| 290,851 | Calver | Dec. 25, 1883 |
| 1,599,481 | Marcuse | Sept. 14, 1926 |
| 1,661,473 | Goddard et al. | Mar. 6, 1928 |
| 1,696,003 | Harvey | Dec. 18, 1928 |
| 1,747,826 | Gould | Feb. 18, 1930 |
| 2,291,534 | Deppe | July 28, 1942 |

FOREIGN PATENTS

| Number | Country | Date |
|---|---|---|
| 18,998 | Great Britain | of 1913 |
| 146,820 | Great Britain | May 5, 1921 |
| 555,420 | France | Mar. 22, 1923 |
| 589,025 | France | Feb. 13, 1924 |